United States Patent
Crivello

(10) Patent No.: US 7,235,593 B2
(45) Date of Patent: Jun. 26, 2007

(54) COMMAND-CURE ADHESIVES

(75) Inventor: James V. Crivello, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 614 days.

(21) Appl. No.: 10/700,318

(22) Filed: Oct. 31, 2003

(65) Prior Publication Data

US 2005/0092428 A1    May 5, 2005

Related U.S. Application Data

(60) Provisional application No. 60/492,352, filed on Aug. 4, 2003.

(51) Int. Cl.
*C08F 2/50* (2006.01)
*B32B 37/12* (2006.01)
*C08G 65/18* (2006.01)
*C08G 65/04* (2006.01)

(52) U.S. Cl. ............ 522/168; 522/49; 522/65; 522/64; 522/67; 522/31; 522/32; 522/170; 522/178; 522/181; 156/272.2; 156/60; 156/273.3; 156/273.5; 156/275.5; 156/275.7

(58) Field of Classification Search .......... 522/49, 522/65, 64, 67, 31, 32, 162, 150, 165, 170, 522/181, 168, 178; 156/272.2, 273.3, 273.5, 156/275.5, 275.7
See application file for complete search history.

(56) References Cited

U.S. PATENT DOCUMENTS

| | | | |
|---|---|---|---|
| 3,415,794 A | 12/1968 | Orth et al. | 260/78.5 |
| 3,457,193 A | 7/1969 | Tinsley et al. | 260/2 |
| 4,289,595 A | 9/1981 | Tortorello | |
| 4,717,605 A * | 1/1988 | Urban et al. | 428/1.53 |
| 5,144,051 A | 9/1992 | Kessel et al. | |
| 5,463,084 A | 10/1995 | Crivello et al. | 549/214 |

2001/0036591 A1    11/2001   Ilg et al.

OTHER PUBLICATIONS

H.Sasaki and J.V.Crivello, "The Synthesis, Characterization, and Photoinitiated Cationic Polymerization of Difunctional Oxetanes", *Journal of Macromolecular Science-Pure Appl. Chem.* A29(10), 915-930 (1992).
J.V. Crivello and H. Sasaki, "Synthesis and Photopolymerization of Silicon-Containing Multifunctional Oxetane Monomers", *Journal of Macromolecular Science-Pure Appl. Chem.* A30 (2&3) 173-187 (1993).
J.V. Crivello and H. Sasaki, "Structure and Reactivity Relationships in the Photoinitiated Cationic Polymerization of Oxetane Monomers", *Journal of Macromolecular Science-Pure Appl. Chem.* A30 (2&3) 189-206 (1993).
B. Falk et. al., "Monitoring Photopolymerization Reactions with Optical Pyrometry", *Journal of Polymer Science: Part A: Polymer Chemistry*, 41, 579-596 (2003).
C. Decker et. al., "Light Intensity and Temperature Effect in Photoinitiated Polymerization", *ACS Symp. Ser.* 673, 63 (1997).
Hiroshi Sasaki Toagosei Co. Ltd., "Oxetanes: Curing Properties in Photo-Cationic Polymerization", *RadTech Technical Proceedings*, 61-68 (2000).
Bidali et. al., "Heat and UV—Ignited Frontal Polymerization of an Epoxy Resin", Poster from Presentation from Ischia, Italy, Jun. 2003.
PCT Notification of Transmittal of the International Search Report and the Written Opinion of the International Searching Authority, or the Declaration, dated Nov. 24, 2004.

* cited by examiner

*Primary Examiner*—Sanza L. McClendon
(74) *Attorney, Agent, or Firm*—Heslin Rothenberg Farley & Mesiti P.C.

(57) ABSTRACT

Reactive adhesive compositions that can be activated with actinic radiation, manipulated for an extended time and then cured thermally are disclosed. The prepolymer mixture for the reactive adhesive contains a catalyst component and a monomer/oligomer component. The monomer or oligomer is chosen from oxetane monomers, oxirane monomers, oxetane oligomers and oxirane oligomers. The oxirane monomers and oligomers have at least one oxygen or sulfur of an ether or thioether in a position two or three carbons removed from the oxygen of the oxirane.

26 Claims, No Drawings

COMMAND-CURE ADHESIVES

CROSS REFERENCE TO RELATED APPLICATIONS

This application claims priority of U.S. provisional application 60/492,352, filed Aug. 4, 2003.

FIELD OF THE INVENTION

The invention relates to a reactive adhesive comprising a mixture of a catalyst component and a monomer or oligomer component that can be activated with actinic radiation, manipulated for an extended time and then cured thermally.

BACKGROUND OF THE INVENTION

There are two basic classes of adhesives in widespread current use. The first class is pressure sensitive adhesives, such as are employed in adhesive tapes. The adhesive is tacky, and bonding takes place primarily due to physical forces of attraction between the adhesive and the substrate surface, when the adhesive is pressed onto a surface. In this case, adhesion is temporary and, if sufficient force is applied, the adhesive can be removed from the substrate. A second class of adhesives, used primarily for structural purposes, is reactive adhesives. During the establishment of the adhesive bond, a reaction takes place, within the adhesive itself and with the substrate(s) to be bonded, that involves the formation of permanent covalent chemical bonds. Such adhesives are more or less permanent, and removal of the adhesive cannot occur except through disruption of the chemical bonds.

Epoxy structural adhesives are reactive adhesives that are widely used in industrial applications. They provide the best combination of thermal resistance, chemical inertness, adhesive bond strength and mechanical characteristics of all known types of adhesives. For this reason, they are widely employed in the aerospace, transportation and electronic industries. Epoxy adhesives also find applications in the joining and bonding of composites, piping and in many construction adhesives employed in the construction, housing and civil engineering industries. The reliability and ease of fabrication utilizing epoxy adhesives have virtually revolutionized these industries and have rendered conventional types of mechanical fasteners (i.e. bolts, screws, nails, etc.) obsolete in many applications. In many cases, the mechanical properties of adhesively bonded joints exceed those made with conventional fasteners. An even greater use of adhesives would be realized if these materials were more convenient to use and underwent faster bonding.

The trade off between working time of a curing system and its ultimate cure time is one of the classic epoxy formulating challenges. Obviously, it is desirable to have plenty of working time at room temperature to complete assembly operations—especially if valuable components are involved. Once assembly is complete, rapid completion of cure is desired so that the next step in the operation can be started. Unfortunately, when these requirements are translated into polymer science terms, a conflict arises. The cure rate of most epoxy systems follows an Arrhenius type relationship wherein the log of cure rate is inversely proportional to the reciprocal of absolute temperature. For many practical applications, process engineers have used the rule of thumb that cure rate will double with each 10° C. increase in the process temperature.

To achieve both good working life and quick process time, a difference in cure rate of about three orders of magnitude is required between the assembly and cure conditions. By the rule of thumb this estimates to roughly 100 degrees difference between assembly and cure temperatures. For this reason, it is typical to find epoxy systems that are assembled at room temperature and cured at 120° C. Curing temperatures of 150 and 180° C. are also common and provide an even greater difference between assembly and curing reaction rates. If one attempts to further reduce the difference between the processing and cure temperatures, the systems become unworkable, because the processing time (i.e. potlife) is correspondingly shortened. In addition, since under these conditions the curing is progressing during the assembly, the characteristics of the adhesive are also constantly changing—making application difficult, unreliable and irreproducible. Ever since the discovery of epoxy resins in the mid 1940's there has been a search for ways to avoid this dilemma.

In many applications subjecting the substrate(s) to be bonded to high temperatures cannot be tolerated, or it is very inconvenient. Therefore, a number of options have been developed for room temperature or a slightly elevated temperature cure. These will be reviewed briefly as possible solutions:

Frozen Systems—In this approach, a highly reactive epoxy curing system is rapidly mixed at room temperature, filled into an application package and then dropped into a dry ice box or similar cold storage. During assembly, the package is thawed and applied. Cure then proceeds at room temperature. This approach avoids the necessity of mixing the adhesive formulation directly at the work site and provides a reasonably fast cure time (eg. 6-8 hours). The disadvantage of such systems is that since the handling characteristics of the adhesive constantly change as the adhesive thaws, it is difficult to automate the application and cure cycles. In addition, once thawed, cure starts spontaneously and the entire batch must be used in a relatively short time. Any excess is wasted and cannot be recovered.

Blocked Catalyst Systems—A number of ingenious systems have been developed to allow incorporation of a highly reactive catalyst system into a resin while blocking its reactivity at room temperature. One of the first systems encapsulated the catalyst inside a wax with a sharp melting point temperature. Below the melting point the system has excellent working life, but it cures extremely rapidly once the melting point is reached. Catalysts have also been blocked by the use of a chemical adduct with a sharp decomposition point temperature. Employing blocked catalysts allows formulation of systems where only about 60° C. difference is required between assembly and final cure temperature. Blocked catalysts have not found much general usage since they tend to be "tempermental" with respect to their cure characteristics and they are subject to spontaneous curing during storage.

Surface Activated Systems—In those instances where polymer systems are cured in close contact with surfaces, a number of novel cure systems have proven effective in supplying good working life followed by rapid room temperature cure. The most common examples are anaerobic and cyanoacrylate adhesives. These systems possess excellent processing characteristics provided the gap between the component surfaces is less than 0.5 mm. Unfortunately, these same adhesives also have poor thermal resistance and cannot be used at even modest temperatures (eg. 100° C.).

Cure-on-Command Systems—These systems typically have very long shelf and working life, but cure rapidly when the assembly operator or an automated assembly system gives the "command". The command usually is the application of actinic radiation to the polymer system being cured. The earliest examples used ultraviolet light, but UV irradiation can only be used only when at least one of the substrates is transparent to light. The cure of opaque, filled or thick cross sections is problematic using UV triggered systems.

"Dual-cure" systems have also been described. They employ both light and heat to achieve cure of epoxy and other types of monomers and they are used in applications in which it is not possible to directly irradiate the material. The dual-curable system is first applied to the substrate and irradiated to form a gelled shell. The gelling process (i.e. a functionally significant increase in viscosity) gives rise to certain problems of its own, and it would be advantageous to avoid gelling if one could. The material, which is usually located such that it cannot be cured by light, is subjected to a thermal treatment designed to trigger the initiator by heat. In some cases, the material is first subjected to low level UV irradiation on one adherand and then very rapidly covered with the other adherand to make an adhesive joint. These latter materials are characterized by a very short "open time". This means that the time from completion of the irradiation to when an adhesive bond may be made is very short, on the order of a few seconds.

As described above, although many schemes have been advanced, at present there appears to be no workable solution to the dilemma of obtaining simultaneously both a long working life and a rapid cure time. In principle the notion of a Command-Cure involves two seemingly diametrically opposed requirements. The first of these requirements is a latent system that is stable for indefinite periods at room temperature. Such systems would, therefore, be said to be storage stable. The second requirement is high reactivity at that would allow the system to undergo cure (polymerization) only when desired and with minimal exposure to heat.

SUMMARY OF THE INVENTION

A solution to this long-standing problem has been found. We have discovered that certain types of epoxide and oxetane resins can be irradiated with UV light in the presence of an onium salt catalyst. The brief irradiation releases a catalyst that instantaneously reacts with the epoxide or oxetanes to form an activated monomeric species. As long as there is no input of thermal energy, the resin remains fluid (i.e. no significant increase in viscosity) for an indefinite period—on the order of hours to days. It can be handled, applied and the components positioned. Simply raising the temperature a few degrees triggers a very rapid polymerization that "sets" the adhesive. Moreover, the temperature of the entire body of the prepolymer mix does not have to be raised to initiate cure; a point of initiation will propagate the reaction throughout the body of the mixture. Under these conditions, the cure can be completed in a few seconds. Prior to irradiation the resin/photoinitiator mixture is shelf stable for months at room temperature and above.

In a first aspect, the invention relates to a process for preparing a prepolymer mixture for a reactive adhesive comprising (a) mixing in the absence of actinic radiation:

(i) a catalyst component comprising from 2 to 50 parts by weight of a cationic photoinitiator chosen from the group consisting of triaryl sulfonium, diaryl iodonium, dialkylphenacylsulfonium and hydroxyphenyl dialkylsulfonium salts having counterions chosen from the group consisting of of $SbF_6^-$, $[(C_6F_5)_4B]^-$, $AsF_6^-$, $PF_6^-$, $C_4F_9SO_3^-$, $FSO_3^-$, $GaF_6^-$, $(CF_3SO_2)_2CH^-$, $(CF_3SO_2)_3C^-$, $BF_4^-$ and $CF_3SO_3^-$; with (ii) a monomer/oligomer component comprising 1000 parts by weight of one or more of a monomer or oligomer chosen from oxetane monomers, oxirane monomers, oxetane oligomers and oxirane oligomers, said oxirane monomers and oligomers having at least one oxygen or sulfur of an ether or thioether in a position two or three carbons removed from the oxygen of the oxirane, to provide a pre-irradiation mixture having a first viscosity which is less than 500,000 centipoises; and (b) exposing the pre-irradiation mixture to actinic radiation while maintaining the temperature of the mixture such that spontaneous polymerization is not induced and an activated prepolymer mixture is produced, said activated prepolymer mixture having a viscosity that is functionally unchanged from the viscosity of the pre-irradiation mixture.

The invention further relates to a process for preparing and curing a reactive adhesive comprising preparing an activated prepolymer mixture for a reactive adhesive as described above and (c) applying heat from an external source at a temperature above or at ambient temperature to the activated prepolymer mixture, whereby polymerization is initiated.

In a further aspect, the invention relates to a process for preparing and curing a reactive adhesive comprising:

(a) mixing in the absence of actinic radiation:

(i) a catalyst component as described above with (ii) a monomer/oligomer component as described above to provide a pre-irradiation mixture as described above;

(b) exposing the pre-irradiation mixture to actinic radiation while maintaining the temperature of the mixture at a first temperature such that spontaneous polymerization is not induced and an activated prepolymer mixture is produced, said activated prepolymer mixture having a viscosity that is functionally unchanged from the viscosity of the pre-irradiation mixture;

(c) manipulating the activated prepolymer mixture; and (d) applying heat from an external source at a second temperature to the activated prepolymer mixture, whereby polymerization is initiated, said second temperature being higher than the first temperature.

In a further aspect, the invention relates to a process for bonding two substrates comprising:

(a) a mixing step as described above (b) an irradiation step to produce an activated prepolymer mixture as described above;

(c) an assembly step comprising bringing together into common contact a first substrate, a second substrate and said activated prepolymer mixture; and (d) a thermal step comprising applying to said activated prepolymer mixture sufficient heat from an external source to initiate polymerization, whereby said activated prepolymer mixture polymerizes and said two substrates are bonded. This aspect may further comprise an application step interposed between the mixing step and the irradiation step. In the application step the pre-irradiation mixture is applied to the first substrate.

In a further aspect, the invention relates to a kit for applying and curing a reactive adhesive comprising:

(a) a pre-irradiation mixture having a viscosity less than 500,000 centipoises as described above and (b) instructions for separately activating and curing the pre-irradiation mixture.

DETAILED DESCRIPTION OF THE INVENTION

The long "open time" of the photoactivated resin systems of the invention are unique and make these systems practical for a wide variety of uses. A second major advantage is the rapid cure that is achieved on application of heat. A third major advantage is the fact that the temperature required to cure such systems is very low. This makes it possible to use these systems for heat-sensitive substrates such as electronic components or for bonding plastic objects. It is also possible to conduct the photoactivation of the resin and then to add materials that would render the system opaque to UV light (e.g. carbon fibers or titanium dioxide) prior to the heat curing step.

Definitions

Throughout this specification the terms and substituents retain their definitions.

Alkyl is intended to include linear, branched, or cyclic hydrocarbon structures and combinations thereof. Lower alkyl refers to alkyl groups of from 1 to 6 carbon atoms. Examples of lower alkyl groups include methyl, ethyl, propyl, isopropyl, butyl, s-and t-butyl and the like. Preferred alkyl groups are those of $C_{20}$ or below. Cycloalkyl is a subset of alkyl and includes cyclic hydrocarbon groups of from 3 to 8 carbon atoms. Examples of cycloalkyl groups include c-propyl, c-butyl, c-pentyl, norbornyl and the like.

$C_1$ to $C_{20}$ Hydrocarbon includes alkyl, cycloalkyl, alkenyl, alkynyl, aryl and combinations thereof. Examples include benzyl, phenethyl, cyclohexylmethyl, camphoryl and naphthylethyl.

Oxaalkyl refers to alkyl residues in which one or more carbons has been replaced by oxygen. Examples include methoxypropoxy, 3,6,9-trioxadecyl and the like.

Aryl and heteroaryl mean a 5- or 6-membered aromatic or heteroaromatic ring containing 0-3 heteroatoms selected from O, N, or S; a bicyclic 9- or 10-membered aromatic or heteroaromatic ring system containing 0-3 heteroatoms selected from O, N, or S; or a tricyclic 13- or 14-membered aromatic or heteroaromatic ring system containing 0-3 heteroatoms selected from O, N, or S. The aromatic 6- to 14-membered carbocyclic rings include, e.g., benzene, naphthalene, indane, tetralin, and fluorene and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole.

Actinic radiation is understood in the art as electromagnetic radiation in the wavelengths that initiate photochemical reactions. (See Academic Press Dictionary of Science and Technology, 1992 p. 31.) This functional definition is intended for the term as it is used in the present application. In the absence of a photosensitizer, radiation in the wavelengths between 4 and 400 nm is actinic radiation. If a photosensitizer is added, longer wavelength radiation can function to initiate photochemical reactions and would in that case be considered equivalent to actinic radiation as defined for this application.

Ambient temperature is the temperature of the surroundings in which a reaction is carried out. For most normal human activities carried out in an enclosed space, unless the temperature of the space is regulated for a purpose not related to human activity, ambient temperature will be close to 23° C.

The terminology relating to inducing "spontaneous polymerization" refers to polymerization that, having been initiated, proceeds substantially to completion in the absence of any external input of energy. The energy released by the polymerization itself is sufficient to drive the reaction. This phenomenon is commonly observed for exothermic polymerizations in which the heat released from a first condensation is sufficient to supply the activation energy for subsequent condensations. In polymerizations that are not "spontaneous", an initial polymerization does not go substantially to completion without the further provision of energy from a source external to the reaction. In the cure of a multifunctional monomer or oligomer used in an adhesive, coating or composite, it is not possible to get high conversion of the functional groups due to gelation and immobilization effects that occur during the crosslinking polymerization. As the functionality increases, the ultimate conversion goes down. Therefore, "substantially to completion" is not an absolute, but rather a relative, numerical concept. "Substantially to completion" thus refers to about 80% of the ultimate or attainable conversion.

The terminology relating to "manipulating" refers to any action relating to forming or deforming a plastic mixture, to moving or displacing a mixture with respect to a substrate with which it is in contact or to bringing a second substrate into contact with the mixture. Such activities as dipping, pressing, pouring, drawing, spreading, extruding and the like are examples of manipulating.

The pre-irradiation mixture and the activated prepolymer mixture are liquids. Viscosity is an inherent property of liquids, and for the purposes of the present invention, materials having a viscosity below 500,000 centipoises (cP) are considered useful liquids. The optimal viscosity will depend on the function of the pre-irradiation mixture and the activated prepolymer mixture, as discussed below. The terminology "functionally unchanged" referring to viscosity means that the viscosity is changed immeasurably or that it is changed measurably but not sufficiently that the change in viscosity alters the function of the mixture. Changes that result in less than 50% increase in absolute viscosity ($\eta$) are to be considered "functionally unchanged".

We have found that certain epoxides and oxetanes, when irradiated with UV light at room temperature in the presence of an onium salt photoinitiator do not undergo spontaneous polymerization. Instead, an activated prepolymer mixture is formed, in which the monomer remains in its original fluid state while more than half the cationic photoinitiator has photodecomposed. This activated prepolymer mixture can be preserved in the activated but unpolymerized state for long periods of time. However, the application of heat to slightly raise the temperature triggers a spontaneous, rapid and exothermic polymerization.

According to the process of the invention, one separates photoactivation from thermal polymerization. Often this will involve photoactivating the adhesive under "cold" UV irradiation conditions. This means that the adhesive is exposed at room temperature or below room temperature using only UV wavelengths in the absence of infrared radiation. This can be readily achieved through the use of fiber or liquid optic light pipes that transmit only UV and not IR radiation. Alternately, a wide assortment of IR or water filters can be used with commercial mercury or xenon arc lamps, or UV emitting diodes or UV lasers may be used. The photoactivated resin is then put into place and positioning adjustments made. Lastly, the adhesive is warmed slightly to initiate the cure. Heating may be achieved using a heat gun, infrared heater, an oven, electrical heating tapes, by ultrasound or microwave irradiation and by induction heating as well as by a number of other techniques that supply thermal energy. The curing process is extremely rapid and can be completed within a few seconds to minutes.

As summarized above, the invention relates in a first aspect to a process for preparing a prepolymer mixture. The process comprises (a) mixing a catalyst component with a monomer/oligomer component in the absence of actinic radiation, and (b) exposing the pre-irradiation mixture to actinic radiation while controlling the temperature of the mixture, so that spontaneous polymerization is not induced, but an activated prepolymer mixture is produced. The activated prepolymer mixture has substantially the same viscosity as the pre-irradiation mixture.

The catalyst component is a cationic photoinitiator chosen from the group consisting of triaryl sulfonium, diaryl iodonium, dialkylphenacylsulfonium and hydroxyphenyl dialkylsulfonium salts having counterions chosen from the group consisting of of $SbF_6^-$, $[(C_6F_5)_4B]^-$, $AsF_6^-$, $PF_6^-$, $C_4F_9SO_3^-$, $FSO_3^-$, $GaF_6^-$, $(CF_3SO_2)_2CH^-$, $(CF_3SO_2)_3C^-$, $BF_4^-$ and $CF_3SO_3^-$. Preferred strong acid anions are $SbF_6^-$ and $[(C_6F_5)_4B]^-$. Cationic photoinitators are commercially available and are described in Advances in Polymer Science 62, 1-48 (1984); in Akhtar et al. Chem. Mater. 2, 732-737 (1990) and in U.S. Pat. Nos. 4,882,201; 4,941,941; 5,073,643; 6,632,960 and 6,031,014. To provide the shortest cure time, a diaryliodonium hexafluoroantimonate or a diaryliodonium tetrakis[pentafluorophenyl] borate are preferred. Delayed cures or higher temperature cures can be afforded through the use of a photoinitiator bearing a $PF_6^-$, $AsF_6^-$, or $CF_3SO_3^-$ anion. The wavelength sensitivity of the system can be adjusted through the use of photosensitizing compounds and dyes.

The monomer/oligomer component is chosen from oxetane monomers, oxirane monomers, oxetane oligomers and oxirane oligomers. The oxirane monomers and oligomers have at least one oxygen or sulfur in a position two or three carbons removed from the oxygen of the oxirane. The oxygen or sulfur is incorporated into an ether or thioether, respectively. Optimal structural characteristics and illustrative examples are provided below.

The compositions are intended to be spread on or mixed into a substrate. For that reason, the pre-irradiation mixture needs a viscosity less than 500,000 cP. Above that viscosity the compositions are too viscous for manipulation. A wide variety of additives and modifiers can be used. These include wetting agents, tackifiers, thixotropic agents, adhesion promoters, shrinkage reducing materials such as polymers and flow control agents. The adhesive may also be filled with inorganic particulate fillers such as silica, talc or clays, as well as impact modifiers, such as core-shell type elastomers. Colorants and dyes can also be added. All of these can modify the viscosity, either intentionally or as a consequence of their presence for other utilities. For example, one might want to increase the viscosity of a prepolymer mixture to keep it in place. Alternatively, one might want to employ, as all or part of a prepolymer mixture, an oligomer that, prior to cure, has certain properties characteristic of pressure sensitive adhesives.

For the purpose of activation, the irradiation may be carried out at ambient temperature, below ambient temperature or even, in certain circumstances, above ambient. With a "fast" cationic photoinitiator (e.g. an iodonium antimony hexafluoride salt) and a relatively reactive monomer, the activation will be most convenient if done at or below 23° C. With a slower cationic photoinitiator and/or less reactive monomer or oligomer, the activation can be done above 23° C. The optimal time, temperature and duration of irradiation can be readily determined by the artisan bearing in mind the use to which the mixture will be put, how long the "pot life" needs to be and how much manipulation will be required subsequent to activation.

Curing the reactive adhesive is accomplished by applying heat. In photopolymerizations that have been described in the art, heat from an external source has occasionally been applied after a photopolymerization has gone almost to completion in order to drive the reaction to a complete cure. This is to be distinguished from the present invention, according to which polymerization does not begin until the heat is applied. The difference may be observed in the viscosity. According to the invention, the viscosity of the activated prepolymer mixture is substantially the same as that of the pre-irradiation mixture. Until heat from an external source is applied, polymerization is not initiated. Once polymerization begins, the viscosity and temperature rise rapidly. This phenomenon of activation and subsequent quiescence until heat is applied is not observed upon irradiation of the vast majority of monomers. Only a select genus of monomers and oligomers characterized above and exemplified below exhibit this phenomenon. The external heat source is advantageously at least 10° C. above the temperature at which the mixture was exposed to actinic radiation. When the irradiation was carried out at or below 23° C., the external source of heat may be above 40° C.

The process for activating, holding and ultimately polymerizing the polymers according to the invention provides a demand cure adhesive. The method for preparing and curing a reactive adhesive comprises:

(a) mixing a catalyst component with a monomer/oligomer component;

(b) exposing the pre-irradiation mixture to actinic radiation while maintaining the mixture at a predetermined temperature;

(c) manipulating the resulting activated prepolymer mixture; and (d) applying heat from an external source.

Other steps may be interposed in this sequence. For example, it may be advantageous in certain applications to mix the catalyst and monomer/oligomer components and then spread them on a substrate before irradiation. In the demand-cure adhesive aspect of the invention, however, the activated prepolymer will be manipulated in some fashion after irradiation and before heat is applied.

Irradiation is necessary to decompose the cationic photoinitiator and liberate the "superacid" which is the catalytically active species. For the cationic photoinitiators of the invention, exposure to total irradiation of 500 to 10,000 mJ/cm$^2$ is generally sufficient to generate a large enough population of catalytically active species for the activation of the monomer/oligomer mix. As long as the temperature is controlled and only actinic radiation impinges on the mixture, more total irradiation than is necessary to decompose the cationic photoinitiator will have no appreciable effect, either beneficial or detrimental. Since inadequate irradiation could obtund the heat-induced polymerization, it is advantageous to insure complete decomposition of the cationic photoinitiator. In general, irradiation for a combination of time and intensity so as to produce decomposition of at least 50% of the cationic photoinitiator is adequate to provide the activated prepolymer mixture.

The foregoing process for a reactive adhesive may be used for bonding two substrates. In this case the manipulation step becomes an assembly step, comprising bringing together into common contact a first substrate, a second substrate and the activated prepolymer mixture. The substrates may be fibers, rigid surfaces, microspheres, nanospheres, irregular particles of various sizes and shapes or any of the usual materials employed in making composites. In certain embodiments at least one of the substrates will be chosen from a rigid metal surface, a rigid glass surface, a rigid polymer surface, a rigid composite surface, a flexible metal surface, a flexible glass surface, a flexible polymer surface and a flexible composite surface.

During the assembly or manipulation step, the irradiation step (b) can be separated from the thermal step (d) by a period of greater than two minutes, greater than five minutes or even greater than ten minutes.

The monomer/oligomer component may be chosen from oxetane monomers, oxirane monomers of formula:

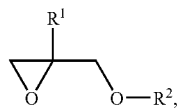

oxetane oligomers of formula:

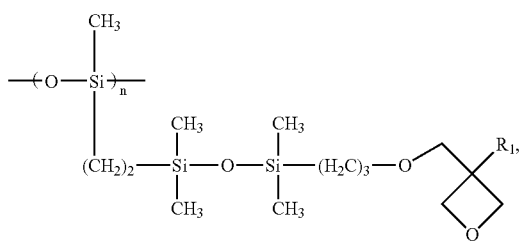

oxetane and oxirane oligomers of formula:

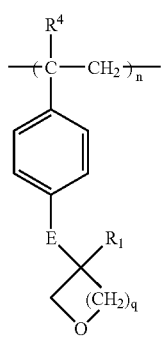

and mixtures of said oxetane and oxirane monomers and oligomers, wherein $R^1$ is hydrogen, oxaalkyl or $C_1$ to $C_{20}$ hydrocarbon;
$R^2$ is chosen from phenyl, perfluoroalkyl and —$CH_2$—$R^3$;
$R^3$ is chosen from $C_2$ to $C_{20}$ hydrocarbon, oxaalkyl, heteroaryl, $C_2$ to $C_{20}$ alkylsiloxane and

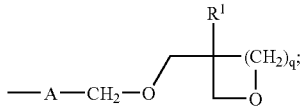

$R^4$ is hydrogen or methyl;
A is chosen from $C_2$ to $C_{20}$ hydrocarbon, oxaalkyl and $C_2$ to $C_{20}$ alkylsiloxane;
E is —$CH_2$—O—, —O—$CH_2$— or $CH_2$—O—$CH_2$—
q is zero or one; and
n is a number such that the viscosity of the oligomer is less than 500,000 centipoises.

In one embodiment the monomer/oligomer component comprises an oxirane and $R^1$ is hydrogen.

In another embodiment the monomer/oligomer component comprises an oxetane chosen from

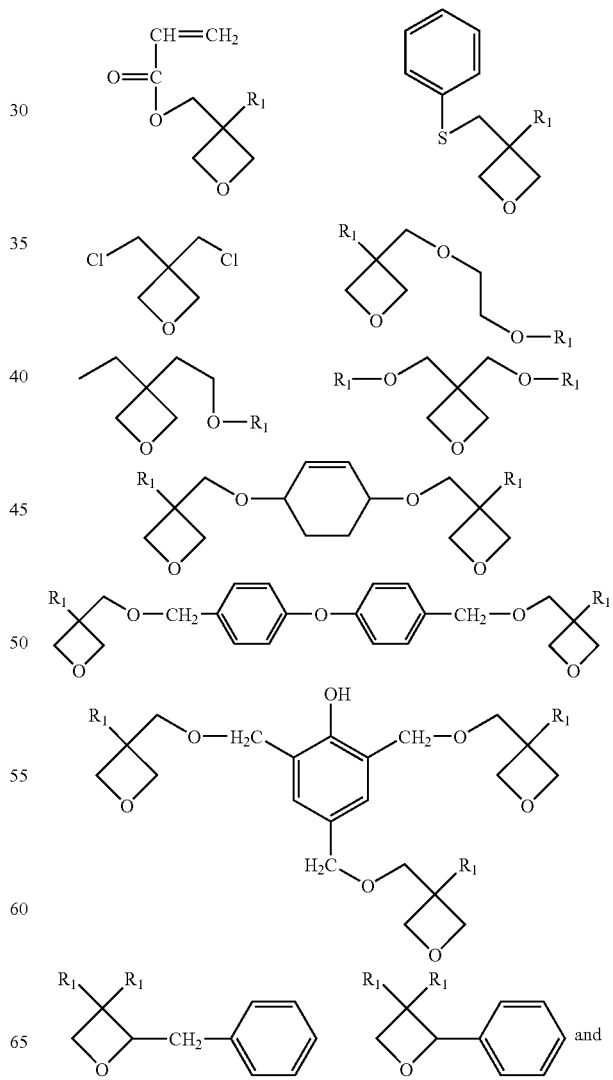

-continued

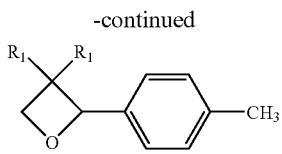

wherein R¹ is hydrogen, oxaalkyl or $C_1$ to $C_{20}$ hydrocarbon.

In another embodiment the monomer/oligomer component comprises an oxetane oligomer chosen from

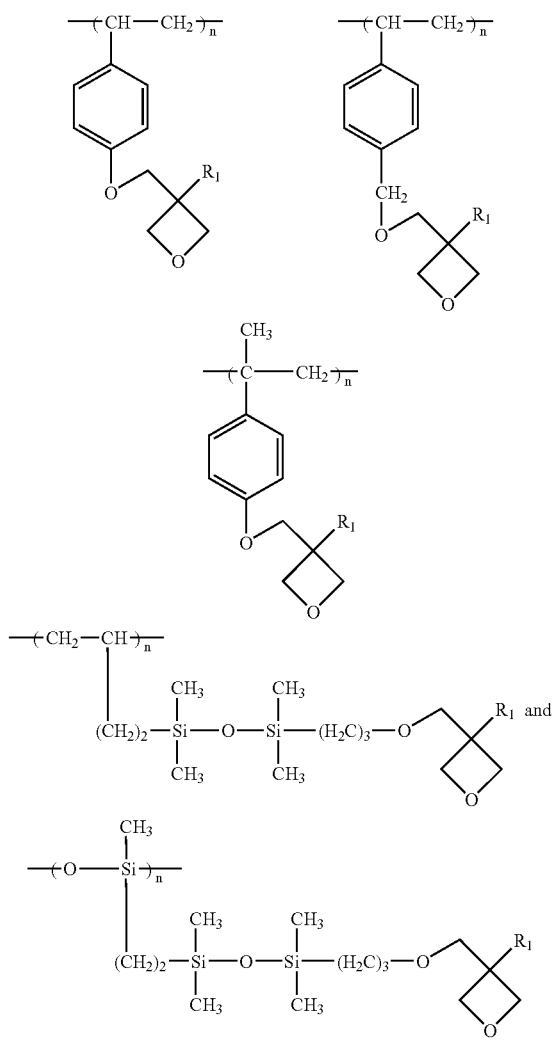

wherein R¹ is hydrogen, oxaalkyl or $C_1$ to $C_{20}$ hydrocarbon; and n is an integer from 5 to 100.

In another embodiment the monomer/oligomer component comprises an oxetane of formula

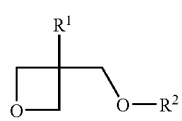

wherein

R¹ is oxaalkyl or $C_1$ to $C_{20}$ hydrocarbon;

R² is chosen from phenyl, perfluoroalkyl and —$CH_2$—R³;

R³ is chosen from $C_2$ to $C_{20}$ hydrocarbon, heteroaryl, oxaalkyl, $C_2$ to $C_{20}$ alkylsiloxane and

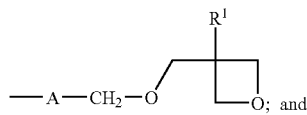

A is chosen from $C_2$ to $C_{20}$ hydrocarbon, oxaalkyl and $C_2$ to $C_{20}$ alkylsiloxane;.

Preferred oxetanes are chosen from the group consisting of:

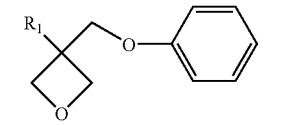

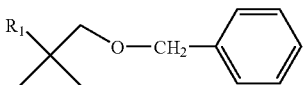

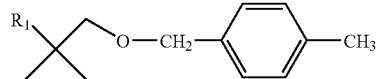

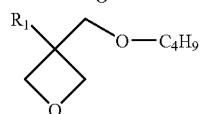 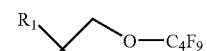

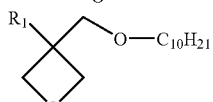 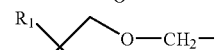

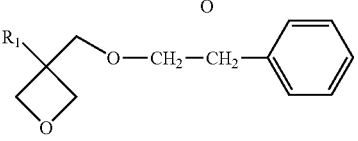

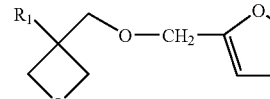

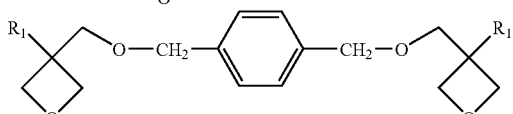

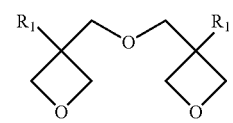

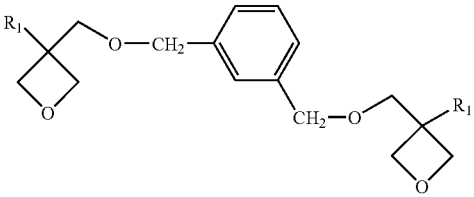

-continued
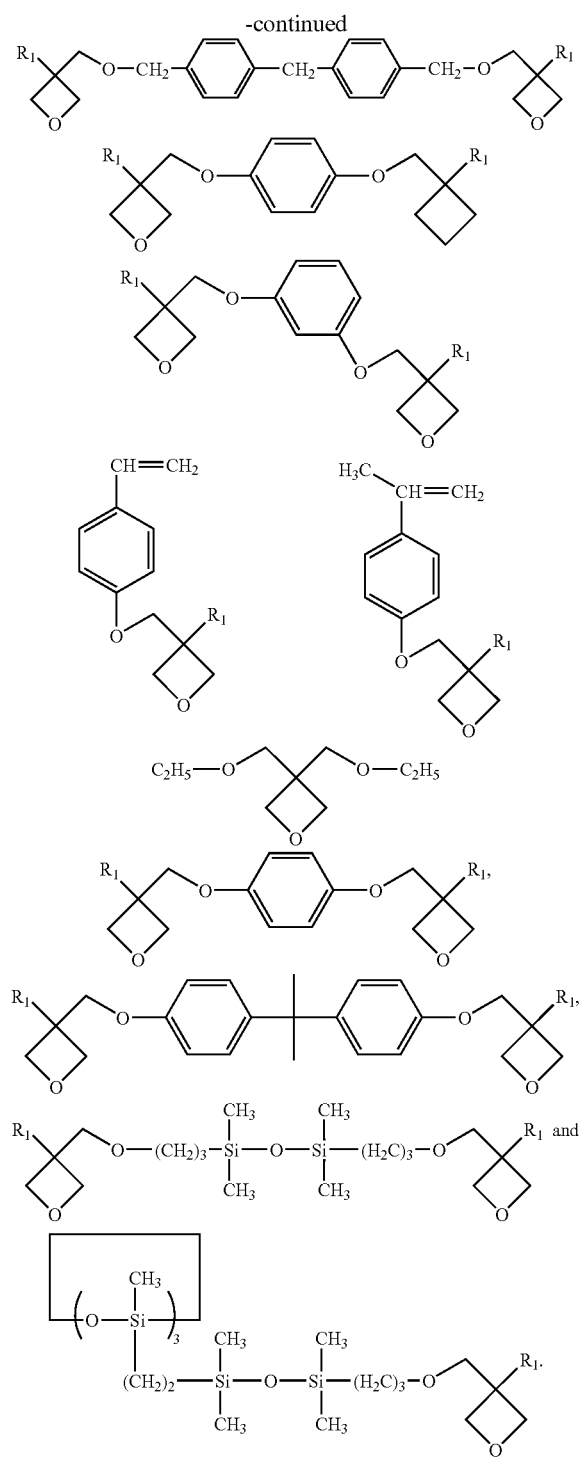
In another preferred embodiment the oxetane is chosen from the group consisting of:
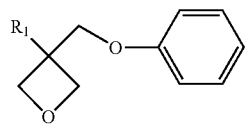
-continued
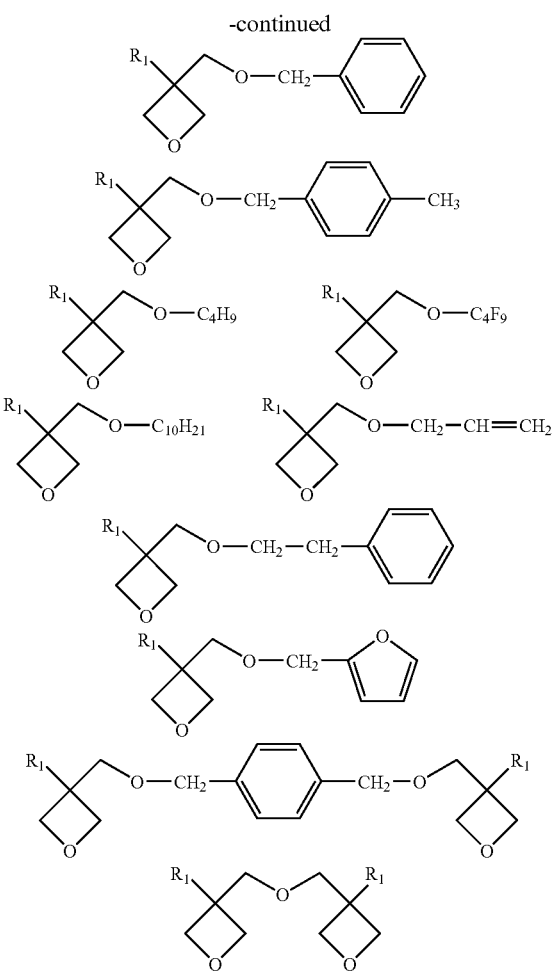
wherein $R^1$ is loweralkyl.
In another embodiment the monomer/oligomer is an oxirane chosen from
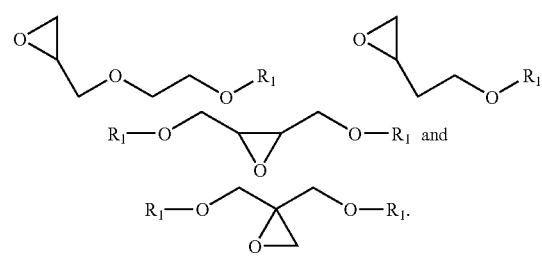
In another embodiment the oxirane is chosen from the group consisting of:
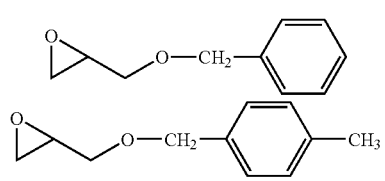

-continued

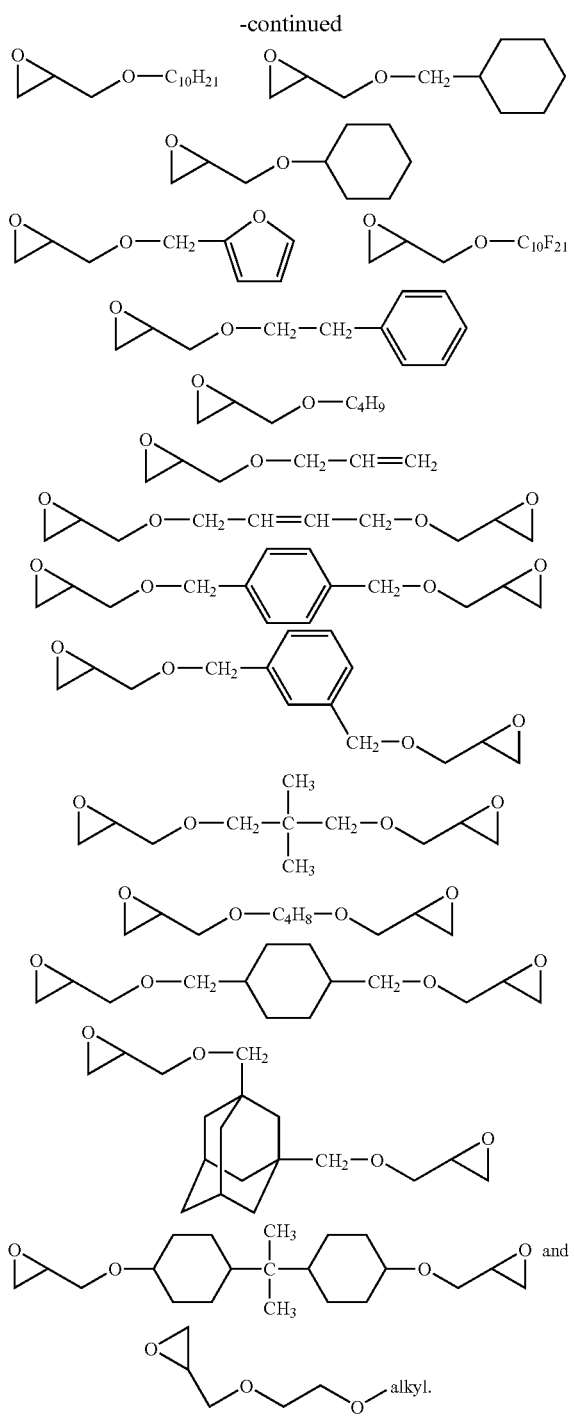

Using such formulated adhesives as described in this invention disclosure, it is possible to bond metals such as steel, aluminum, copper, zinc, titanium, as well as a wide assortment of metallic alloys. In addition, the adhesive and method can be used to provide bonds to glass, ceramics and plastics. For example, the "Command Cure Adhesives" described here could be used as assembly adhesives for mounting fiber optic and other optoelectronic components. This technology is well suited to applications such as the assembly line construction of aircraft and automobiles. The adhesive can be applied to the part and irradiated for a short period of time. This is followed by placing the part in position on the auto body or frame and briefly heating with, for example, a heat gun. A permanent, strong bond is formed in seconds. Similar assembly and cure operations can be applied to mounting electronic components on circuit boards or attaching integrated circuit dies to lead frames. Likewise, the adhesive bonding described here is suited to the assembly of medical devices, compact disks, pens, and numerous other applications that will be apparent to persons of skill in the art.

Although a major thrust of this invention is directed towards adhesive compositions, this is not intended to be the sole use of such "Command Cure" systems. For example, the systems can be formulated to serve as shims for the assembly of aircraft structural frames. Similarly, the systems can be employed for low temperature liquid curing casting, potting and encapsulation purposes. Uses include die attach adhesives, electronic and electrical encapsulations, replacement for solder in automotive body panel applications, putty and fillers for filling joints and seams between metals, concrete, glass or plastics. An additional application is for low temperature curable fiber reinforced composites.

Several modes of application of the Command Cure compositions can be envisioned. These include application of the adhesive formulation to a substrate followed by UV activation. A part to be bonded is then placed in contact with the substrate and adhesive and heat is applied to induce cure. Alternatively, UV activation can be carried out in a vessel by simultaneous irradiation while stirring or using other means of agitation. It is important that the irradiation be carried out at a temperature that is controlled below the temperature at which spontaneous polymerization would be initiated. For most common, convenient industrial processes the temperature will be held below 40° C. and preferably below 30° C. This can be carried out through the use of "cold" UV light (UV light that contains little or no infrared irradiation) or by chilling (i.e. below 23° C.) the formulation prior to or during irradiation. Once activated, the formulation can then be used immediately or stored for some time either at room temperature or under refrigeration. The "activated" formulation can be applied to the substrates and the parts positioned as desired. The last step involves exposure to heat, ultrasound or microwave, etc. to induce curing. In an automated assembly operation, the command cure composition may be applied to one substrate by any one of several methods including spraying, screen-printing, syringe dispensing, roll coating, etc. Then, the substrate with the adhesive may be UV or visible light-activated on an automated exposure line. The substrate together with the "activated" adhesive composition can be placed into position for bonding, and the cure initiated with heat as described previously. Using such a procedure, only sufficient adhesive would be activated for a given application. There would be no wastage of the adhesive. Prior to irradiation, the adhesive formulation has a very long storage life (years).

The technology described herein is especially convenient for assembly-line type bonding of components such as automobiles, furniture, laminates, mounting of electronic components on circuit boards and a myriad of other types of bonding operations. For example, a thixotropic command cure adhesive may be screen-printed on a predrilled circuit board and the board and adhesive passed through a tunnel in which it is subjected to "cold" UV irradiation. The electronic components are then placed on the circuit board and held in place by the tacky adhesive. Permanent bonding of the components takes place when the circuit board is briefly heated during the wave soldering operation.

In another embodiment of this invention is the fabrication and cure of composites. A matrix resin as described above is irradiated with UV light. This resin is subsequently used to impregnate a fiber mat. Layers of impregnated mat are combined one on top of the other and then placed in a press and heated for a very short time to complete the cure. In those cases in which the fiber mat is transparent to UV light, the impregnated mat can be directly irradiated.

In addition to the applications described above for these materials, one can conceive many others as well. For example, a unique application is for dental adhesives. A dentist can apply the activated prepolymer to a tooth prepared to receive a crown. The crown is then put into place and as the adhesive warms to body temperature, the activated prepolymer undergoes cure to permanently bond the crown into place.

EXAMPLES

Example 1

The irradiation of AOX (3-ethyl-3-allyloxyoxetane) for 5 minutes at 1635 mJ/cm$^2$ min in the presence of 2% % (4-n-decyloxyphenyl)phenyliodonium hexafluoroantimonate (IOC10) leads to a stable colorless liquid. When this liquid is heated briefly, the polymerization takes place as a front that passes the detector of the instrument in 12 seconds. Once triggered, the polymerization takes place very rapidly with a very high temperature rise within a short period of time. The adhesive can be irradiated to give an activated prepolymer mixture that can be handled for at least 5 minutes. Once the polymerization is started with heat, it progresses rapidly and exothermically.

Example 2

UV irradiation of XDO (1,4-xylidene-bis(3-ethyl-3-oxymethyloxetane)) for 6 minutes at 497 mJ/cm$^2$ min in the presence of 1 mol % IOC15 [(4-n-pentadecyloxyphenyl)phenyliodonium hexafluoroantimonate] produces no observable polymerization. However, the polymerization progresses very rapidly when heat is applied after a total elapsed time of 6 minutes and 33 seconds.

Examples 3 and 4

Neopentylglycol diglycidyl ether and 1,4-butanediol diglycidyl ether that had been previously subjected to UV irradiation for 6 minutes at 413 mJ/cm$^2$ min in the presence of 1 mol % IOC15 ((4-n-pentadecyloxyphenyl)phenyliodonium hexafluoroantimonate) exhibit no observable polymerization in either case. However, the polymerization of both monomers progress very rapidly when heat is applied after a total time elapse of 6 minutes and 22 seconds.

Example 5

An 80/20 mixture by weight of AOX and XDO were irradiated with UV light for 5 minutes at 522 mJ/cm$^2$ min in the presence of 1 mol % IOC15. No observable polymerization took place. When heating was applied after a total elapsed time of 5 minutes 12 seconds, polymerization of the mixture took place rapidly.

Example 6

A mixture containing 80% benzyl glycidyl ether and 20% neopentylglycidyl ether together with 1% IOC15 were irradiated with UV light at 501 mJ/cm$^2$ min for 5 minutes. No polymerization took place. When heat was applied after a total elapsed time of 5 minutes and 37 seconds, rapid, highly exothermic polymerization of the mixture took place.

Example 7

A sample of 4.9 g XDO (1,4-xylidene-bis(3-ethyl-3-oxymethyloxetane)) and 0.1 g POX containing 1 mol % IOC15 was irradiated in a shallow aluminum pan with UV light for 5 minutes at a light intensity of 500 mJ/cm$^2$ min. The irradiated liquid sample was spread onto a 7.5 cm×7.5 cm square of glass cloth and 3 additional layers of glass cloth and resin laid on top of the first one. A steel plate treated with poly(tetrafluoroethylene) was laid on top of the laminate and a heat gun applied to warm the sample. After heating in this way for approximately 2 minutes, a fully consolidated crosslinked laminate was obtained.

Example 8

A sample of 4.9 g XDO (1,4-xylidene-bis(3-ethyl-3-oxymethyloxetane)) and 0.1 g POX (3-ethyl-3-[(phenoxy)methyl]oxetane) containing 1 mol % IOC 15 was spread onto a steel plate and irradiated with UV light for 5 minutes at a light intensity of 500 mJ/cm$^2$ min through a mask. The irradiated liquid sample was then briefly heated on a hot plate at 50° C. Polymerization took place only in the irradiated zones to give a crosslinked positive image of the mask.

Example 9

A mixture of XDO (1,4-bis[(3-ethyl-3-oxetanylmethoxy)methyl]-benzene) containing 1 mol % (4-n-decyloxyphenyl) phenyliodonium hexafluoroantimonate (IOC10) was placed as a 3 mil film on a steel plate. The mixture was irradiated with UV light using a UVEX spot cure lamp system equipped with a fiber optic cable for six minutes. At the end of this time, the mixture was still in the liquid state. An identical steel plate was placed over the first one and the two plates were heated briefly with a heat gun. A permanent bond was achieved after approximately five seconds.

The invention claimed is:

1. A process for preparing a prepolymer mixture for a reactive adhesive comprising
(a) mixing in the absence of actinic radiation:
   (i) a catalyst component consisting of from 2 to 50 parts by weight of a cationic photoinitiator chosen from the group consisting of triaryl sulfonium, diaryl iodonium, dialkylphenacylsulfonium and hydroxyphenyl dialkylsulfonium salts having counterions chosen from the group consisting of SbF$_6^-$, [(C$_6$F$_5$)$_4$B]$^-$, AsF$_6^-$, PF$_6^-$, C$_4$F$_9$SO$_3^-$, FSO$_3^-$, GaF$_6^-$, (CF$_3$SO$_2$)$_2$CH$^-$, (CF$_3$SO$_2$)$_3$C$^-$, BF$_4^-$ and CF$_3$SO$_3^-$; with
   (ii) a monomer/oligomer component comprising 1000 parts by weight of one or more of a monomer or oligomer chosen from oxetane monomers, oxirane monomers, oxetane oligomers and oxirane oligomers, said oxirane monomers and oligomers having at least one oxygen or sulfur of an ether or thioether in a position two or three carbons removed from the oxygen of the oxirane, to provide a pre-irradiation mixture, said pre-irradiation mixture containing no ethylenically substituted monomers that can be polymerized by free radicals, and said pre-irradiation mixture having a first viscosity which is less than 500,000 centipoises; and (b) exposing said pre-irradiation mixture to actinic radiation while maintaining the temperature of said mixture such that spontaneous polymerization is not induced and an activated prepolymer mixture is produced, said activated prepolymer mixture having a viscosity that is functionally unchanged from the viscosity of said pre-irradiation mixture.

2. A process according to claim 1 wherein said step (b) of exposing said mixture to actinic radiation is carried out at or below ambient temperature.

3. A process for preparing and curing a reactive adhesive comprising preparing an activated prepolymer mixture for a reactive adhesive according to claim 1 and (c) applying heat from an external source at a temperature above or at ambient temperature to said activated prepolymer mixture, whereby polymerization is initiated.

4. A process for preparing and curing a reactive adhesive comprising preparing an activated prepolymer mixture for a reactive adhesive according to claim 2 and (c) applying heat from an external source to said activated prepolymer mixture, said external heat source being 10° C. or more above the temperature at which said mixture was exposed to actinic radiation.

5. A process for preparing and curing a reactive adhesive comprising:

(a) mixing in the absence of actinic radiation:

(i) a catalyst component consisting of from 2 to 50 parts by weight of a cationic photoinitiator chosen from the group consisting of triaryl sulfonium, diaryl iodonium, dialkylphenacylsulfonium and hydroxyphenyl dialkylsulfonium salts having counterions chosen from the group consisting of of $SbF_6^-$, $[(C_6F_5)_4B]^-$, $AsF_6^-$, $PF_6^-$, $C_4F_9SO_3^-$, $FSO_3^-$, $GaF_6^-$, $(CF_3SO_2)_3CH^-$, $(CF_3SO_2)_3C^-$, $BF_4^-$ and $CF_3SO_3^-$;

with (ii) a monomer/oligomer component comprising 1000 parts by weight of one or more of a monomer or oligomer chosen from oxetane monomers, oxirane monomers, oxetane oligomers and oxirane oligomers, said oxirane monomers and oligomers having at least one oxygen or sulfur of an ether or thioether in a position two carbons removed from the oxygen of the oxirane, to provide a pre-irradiation mixture, said pre-irradiation mixture containing no ethylenically substituted monomers that can be polymerized by free radicals, and said pre-irradiation mixture having a first viscosity which is less than 500,000 centipoises;

(b) exposing said pre-irradiation mixture to actinic radiation while maintaining the temperature of said mixture at a first temperature such that spontaneous polymerization is not induced and an activated prepolymer mixture is produced, said activated prepolymer mixture having a viscosity that is functionally unchanged from the viscosity of said pre-irradiation mixture;

(c) manipulating said activated prepolymer mixture; and (d) applying heat from an external source at a second temperature to said activated prepolymer mixture, whereby polymerization is initiated, said second temperature being higher than said first temperature.

6. A process according to claim 5 wherein said exposing step (b) comprises exposing said mixture to total irradiation of 500 to 10,000 mJ/cm².

7. A process according to claim 5 wherein said second temperature is 10° C. or more above said first temperature.

8. A process for bonding two substrates comprising:

(a) a mixing step comprising mixing in the absence of actinic radiation:

(i) a catalyst component consisting of from 2 to 50 parts by weight of a cationic photoinitiator chosen from the group consisting of triaryl sulfonium, diaryl iodonium, dialkyiphenacylsulfonium and hydroxyphenyl dialkylsulfonium salts having counterions chosen from the group consisting of of $SbF_6^-$, $[(C_6F_5)_4B]^-$, $AsF_6^-$, $PF_6^-$, $C_4F_9SO_3^-$, $FSO_3^-$, $GaF_6^-$, $(CF_3SO_2)_2CH^-$, $(CF_3SO_2)_3C^-$, $BF_4^-$ and $CF_3SO_3^-$;

with (ii) a monomer/oligomer component comprising 1000 parts by weight of one or more of a monomer or oligomer chosen from oxetane monomers, oxirane monomers, oxetane oligomers and oxirane oligomers, said oxirane monomers and oligomers having at least one oxygen or sulfur of an ether or thioether in a position two or three carbons removed from the oxygen of the oxirane, to provide a pre-irradiation mixture, said pre-irradiation mixture containing no ethylenically substituted monomers that can be polymerized by free radicals, and said pre-irradiation mixture having a first viscosity which is less than 500,000 centipoises;

(b) an irradiation step comprising exposing said pre-irradiation mixture to actinic radiation while maintaining the temperature of said mixture at a temperature such that spontaneous polymerization is not induced and an activated prepolymer mixture is produced, said activated prepolymer mixture having a viscosity that is functionally unchanged from the viscosity of said pre-irradiation mixture;

(c) an assembly step comprising bringing together into common contact a first substrate, a second substrate and said activated prepolymer mixture; and (d) a thermal step comprising applying to said activated prepolymer mixture sufficient heat from an external source to initiate polymerization, whereby said activated prepolymer mixture polymerizes and said two substrates are bonded.

9. A process according to claim 8 additionally comprising an application step interposed between said mixing step and said irradiation step, wherein said pre-irradiation mixture is applied to said first substrate.

10. A process according to claim 1 wherein said monomer/oligomer component is chosen from oxetane monomers, oxirane monomers of formula:

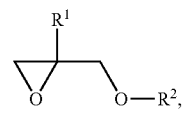

oxetane oligomers of formula:

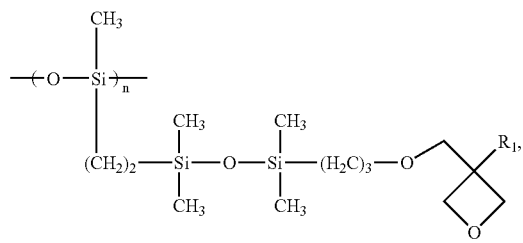

oxetane and oxirane oligomers of formula:

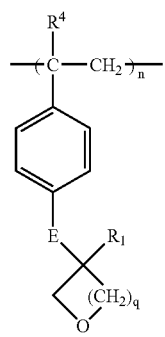

and mixtures of said oxetane and oxirane monomers and oligomers, wherein $R^1$ is hydrogen, oxaalkyl or $C_1$ to $C_{20}$ hydrocarbon;

$R^2$ is chosen from phenyl, perfluoroalkyl and —$CH_2$—$R^3$;

$R^3$ is chosen from $C_2$ to $C_{20}$ hydrocarbon, oxaalkyl, heteroaryl, $C_2$ to $C_{20}$ alkylsiloxane and

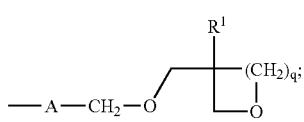

$R^4$ is hydrogen or methyl;

A is chosen from $C_2$ to $C_{20}$ hydrocarbon, oxaalkyl and $C_2$ to $C_{20}$ alkylsiloxane;

E is —$CH_2$—O—, —O—$CH_2$— or $CH_2$—O—$CH_2$—;

q is zero or one; and n is a number such that the viscosity of the oligomer is less than 500,000 centipoises.

11. A process according to claim 10 wherein said monomer/oligomer component comprises an oxetane chosen from

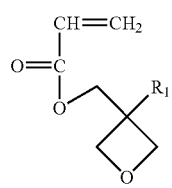 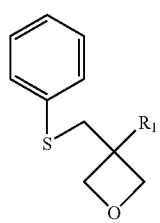

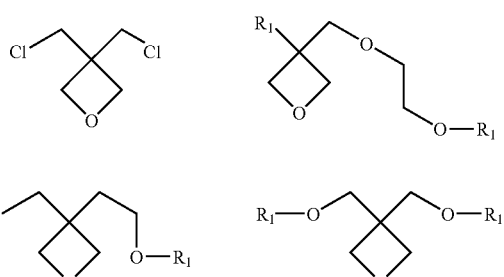

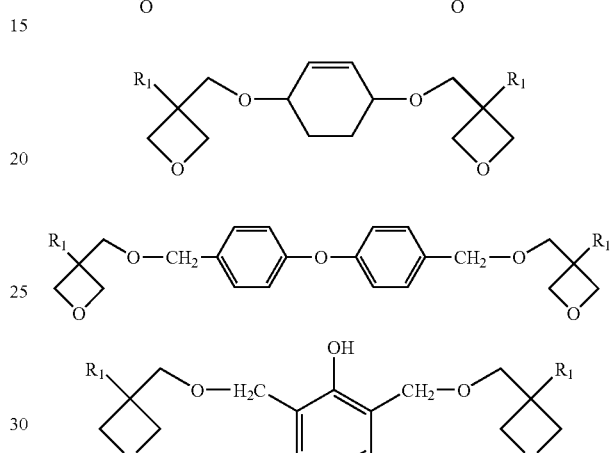

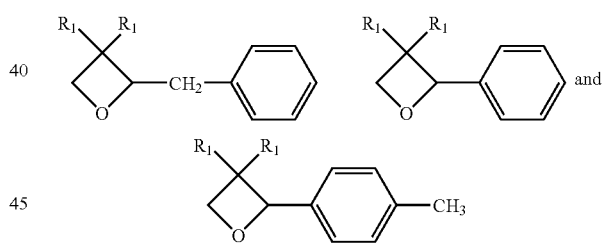

wherein $R^1$ is hydrogen, oxaalkyl or $C_1$ to $C_{20}$ hydrocarbon.

12. A process according to claim 10 wherein said monomer/oligomer component comprises an oxetane oligomer chosen from

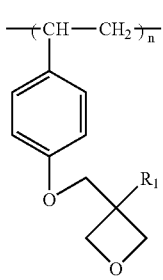 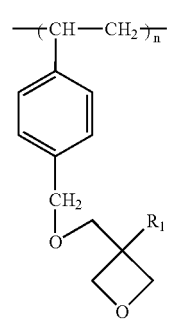

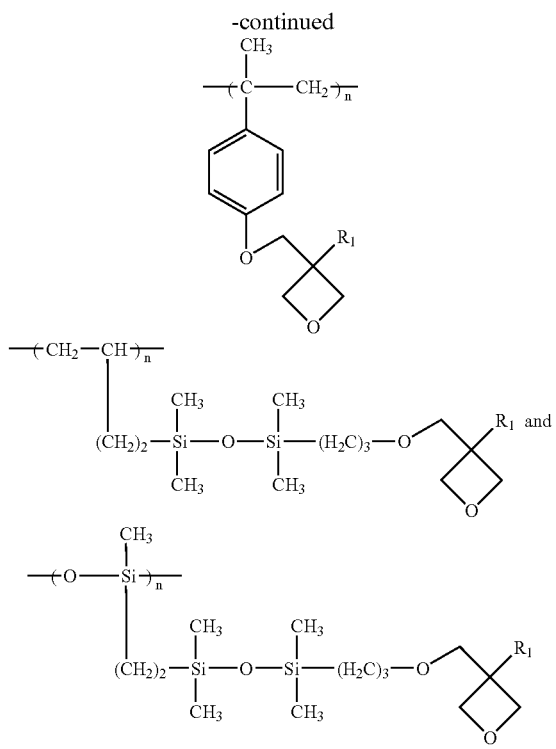

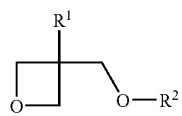

wherein $R^1$ is hydrogen, oxaalkyl or $C_1$ to $C_{20}$ hydrocarbon; and n is an integer from 5 to 100.

13. A process according to claim 10 wherein said monomer/oligomer component comprises an oxetane of formula

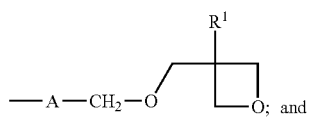

wherein $R^1$ is oxaalkyl or $C_1$ to $C_{20}$ hydrocarbon;
$R^2$ is chosen from phenyl, perfluoroalkyl and —$CH_2$—$R^3$;
$R^3$ is chosen from $C_2$ to $C_{20}$ hydrocarbon, heteroaryl, oxaalkyl, $C_2$ to $C_{20}$ alkylsiloxane and

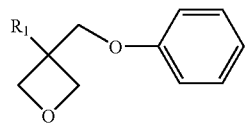

A is chosen from $C_2$ to $C_{20}$ hydrocarbon, oxaalkyl and $C_2$ to $C_{20}$ alkylsiloxane.

14. A process according to claim 13 wherein said oxetane is chosen from the group consisting of:

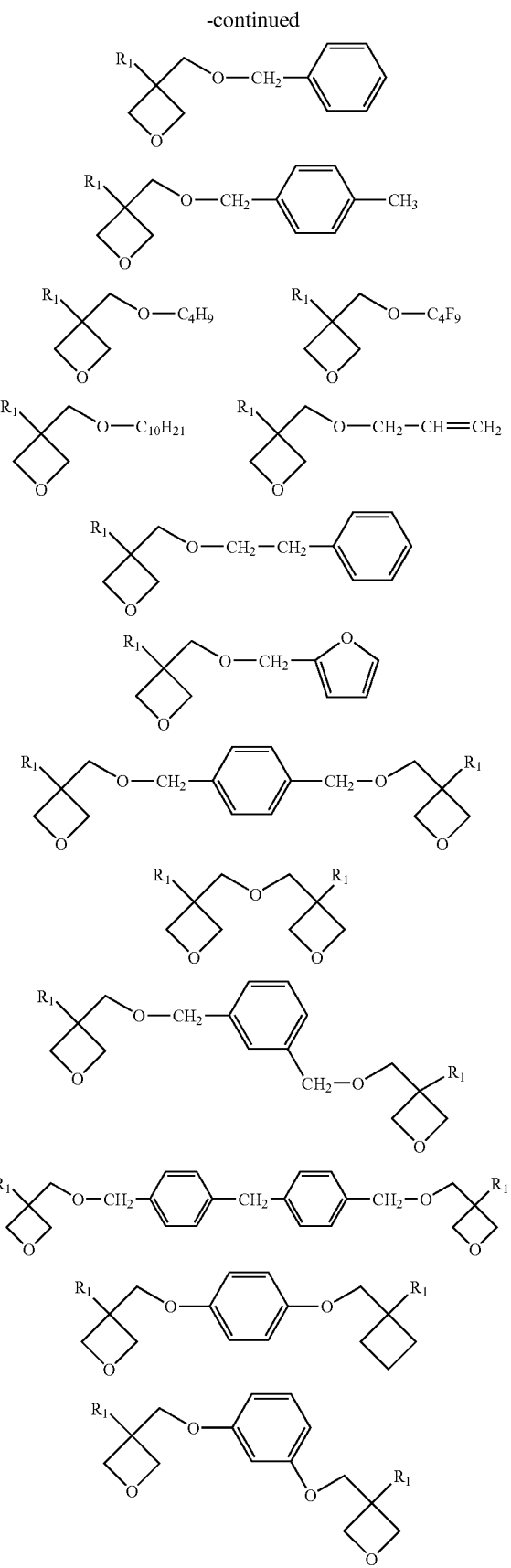

15. A process according to claim 14 wherein said oxetane is chosen from the group consisting of:

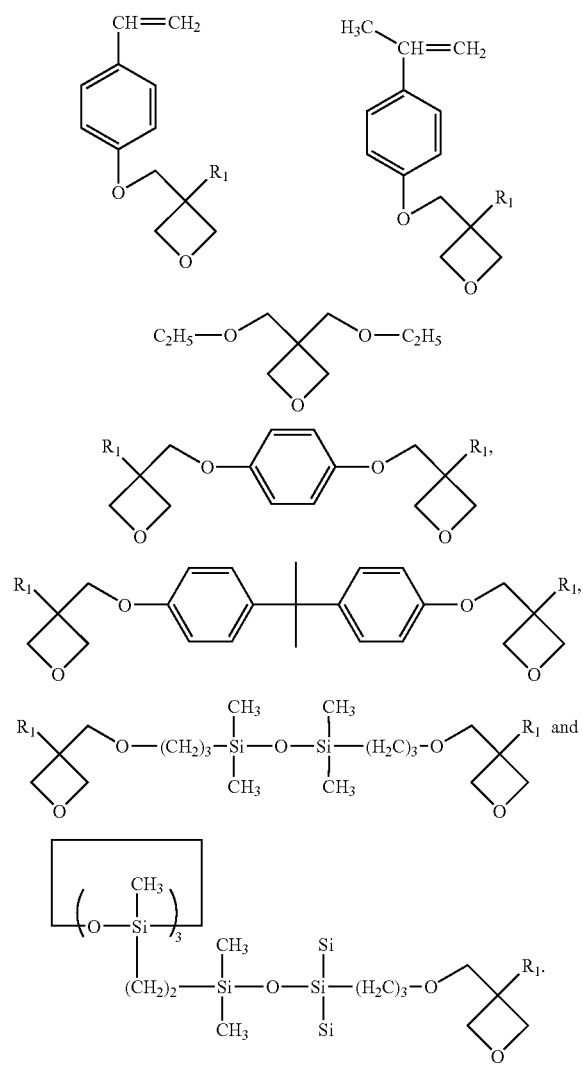

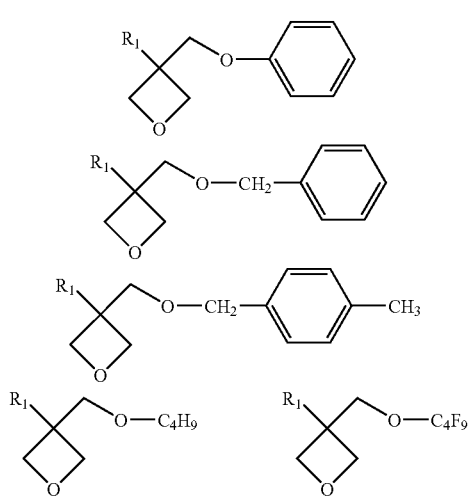

wherein $R^1$ is loweralkyl.

16. A process according to claim 1 wherein said oxirane is chosen from

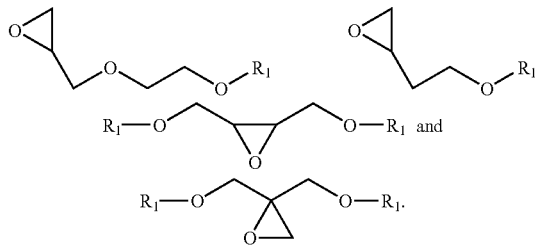

17. A process according to claim 10 wherein said oxetane or oxirane is an oxirane and $R^1$ is hydrogen.

18. A process according to claim 17 wherein said oxirane is chosen from the group consisting of:

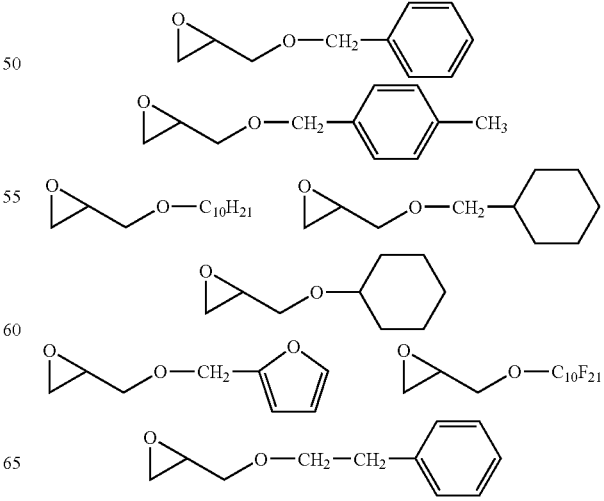

-continued

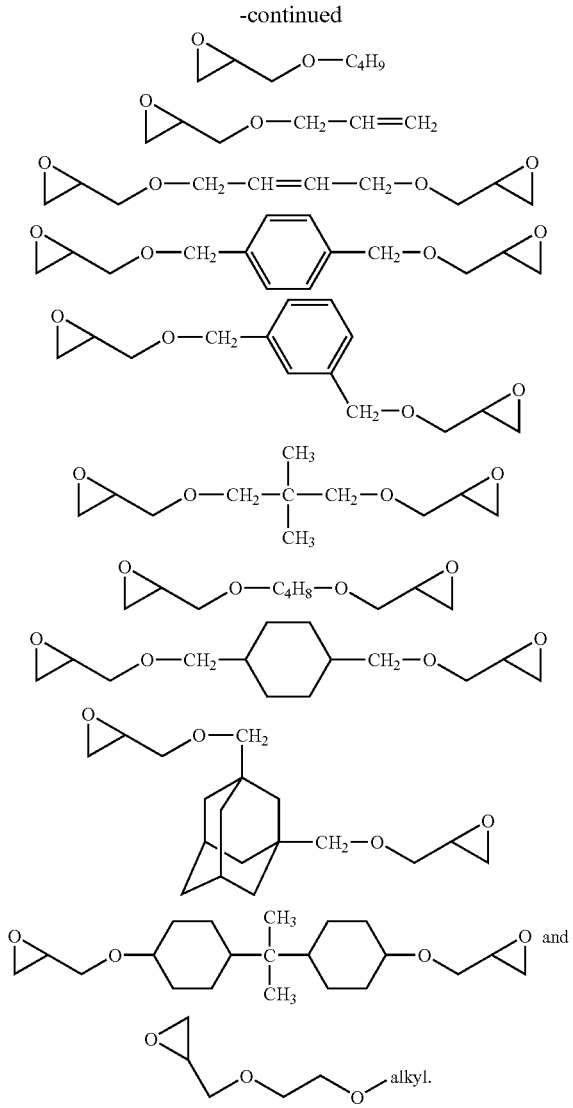

19. A process according to claim 8 wherein both said substrates are fibers.

20. A process according to claim 8 wherein at least one of said substrates is a rigid surface.

21. A process according to claim 8 wherein at least one of said substrates is chosen from a rigid metal surface, a rigid glass surface, a rigid polymer surface, a rigid composite surface, a flexible metal surface, a flexible glass surface, a flexible polymer surface and a flexible composite surface.

22. A process according to claim 8 wherein said irradiation step (b) is separated from said thermal step (d) by a period of greater than two minutes.

23. A process according to claim 22 wherein said irradiation step (b) is separated from said thermal step (d) by a period of greater than five minutes.

24. A process according to claim 22 wherein said irradiation step (b) is separated from said thermal step (d) by a period of greater than ten minutes.

25. A process according to claim 8 wherein said irradiation step (b) is carried out below ambient temperature and said thermal step (d) is carried by applying an external source of heat above 40° C.

26. A kit for applying and curing a reactive adhesive comprising:

(a) a pre-irradiation mixture, said pre-irradiation mixture containing no ethylenically substituted monomers that can be polymerized by free radicals, and said pre-irradiation mixture having a viscosity less than 500,000 centipoises which comprises (i) a catalyst component consisting of from 2 to 50 parts by weight of a cationic photoinitiator chosen from the group consisting of triaryl sulfonium, diaryl iodonium, dialkylphenacylsulfonium and hydroxyphenyl dialkylsulfonium salts having counterions chosen from the group consisting of of $SbF_6^-$, $[(C_6F_5)_4B]^-$, $AsF_6^-$, $PF_6^-$, $C_4F_9SO_3^-$, $FSO_3^-$, $GaF_6^-$, $(CF_3SO_2)_2CH^-$, $(CF_3SO_2)_3C^-$, $BF_4^-$ and $CF_3SO_3^-$;

and (ii) a monomer/oligomer component comprising 1000 parts by weight of one or more of a monomer or oligomer chosen from oxetane monomers, oxirane monomers, oxetane oligomers and oxirane oligomers, said oxirane monomers and oligomers having at least one oxygen or sulfur of an ether or thioether in a position two or three carbons removed from the oxygen of the oxirane; and (b) instructions for separately activating and curing said pre-irradiation mixture.

* * * * *

UNITED STATES PATENT AND TRADEMARK OFFICE
CERTIFICATE OF CORRECTION

PATENT NO. : 7,235,593 B2
APPLICATION NO. : 10/700318
DATED : June 26, 2007
INVENTOR(S) : Crivello It is certified that error appears in the above-identified patent and that said Letters Patent is hereby corrected as shown below:

In The Claims:

Col. 19, line 37, delete "group consisting of of" and insert -- group consisting of --

Col. 19, line 39, delete "$FSO_3^-$, $GaF_6^-$, $(CF_3SO_2)_3CH^-$, $(CF_3SO_2)_3C^-$, $BF_4^-$"
and insert -- $FSO_3^-$, $GaF_6^-$, $(CF_3SO_2)_2CH^-$, $(CF_3SO_2)_3C^-$, $BF_4^-$ --

Col. 20, line 6, delete "." after 10° C

Col. 20, line 14, delete "dialkyiphenacylsulfonium" and insert
-- dialkylphenacylsulfonium --

Col. 20, line 16, delete "group consisting of of" and insert -- group consisting of --

Col. 21, lines 60-65, delete: 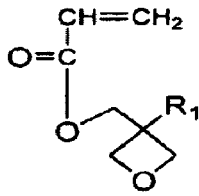

Col. 24, line 54-59, delete: 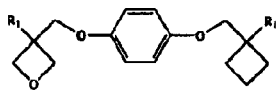

and insert: 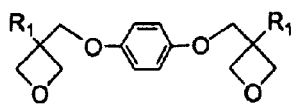

Col. 25, lines 1-10, delete: 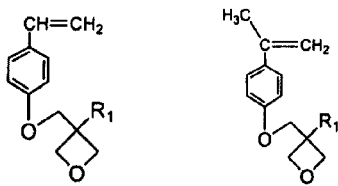

and

UNITED STATES PATENT AND TRADEMARK OFFICE
CERTIFICATE OF CORRECTION

PATENT NO. : 7,235,593 B2
APPLICATION NO. : 10/700318
DATED : June 26, 2007
INVENTOR(S) : Crivello It is certified that error appears in the above-identified patent and that said Letters Patent is hereby corrected as shown below:

Col. 25, lines 35-45, delete: 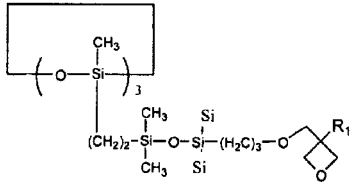

and insert: 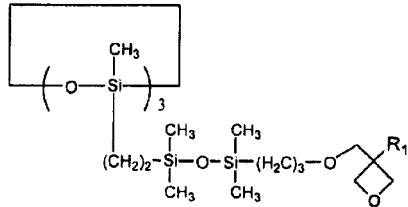

Col. 26, lines 1-6, delete: 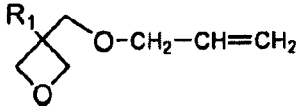

Col. 27, lines 5-10, delete: 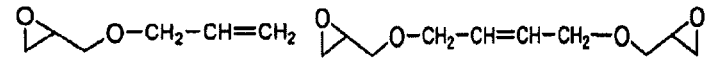

Col. 28, line 33, delete "group consisting of of" and insert -- group consisting of --

Signed and Sealed this

Nineteenth Day of February, 2008

JON W. DUDAS
*Director of the United States Patent and Trademark Office*